Feb. 13, 1940.   O. LEPERSONNE   2,190,238
HYDROCOMPOUND BRAKING SYSTEM
Filed Jan. 4, 1934   2 Sheets-Sheet 1

Inventor
Octave Lepersonne
by
atty.

Feb. 13, 1940.  O. LEPERSONNE  2,190,238
HYDROCOMPOUND BRAKING SYSTEM
Filed Jan. 4, 1934    2 Sheets-Sheet 2

Inventor
O. Lepersonne
By
Attorney

Patented Feb. 13, 1940

2,190,238

UNITED STATES PATENT OFFICE 2,190,238

HYDROCOMPOUND BRAKING SYSTEM

Octave Lepersonne, Brussels, Belgium

Application January 4, 1934, Serial No. 705,292
In France January 6, 1933

1 Claim. (Cl. 60—54.6)

This invention relates to a system for transmitting motion and power between a motive member and one or several receptive members using fluid under pressure and more especially as embodied in hydraulic braking mechanisms; said system acts in at least two steps, comparatively little pressure combined to comparatively great supply of liquid being required in the first step corresponding to the taking up of the play of the brake jaws and comparatively great pressure combined to comparatively little supply of liquid being required during the second step corresponding to the actual braking operation, the changing of steps being automatically operated as the braking effort increases.

Hydraulic transmitting power systems are known in which the cylinder, in which pressure is applied to the fluid pressure medium, is provided with piston of stepped construction so that both pistons serve for displacing liquid during the first step for taking up plays or exerting a slight effort whereas the small or high pressure piston alone is used for applying a great effort, liquid behind large or low pressure piston being, from the time the low pressure piston is cut out of action, discharged towards a reservoir having no communication with the receptive cylinders and back pressure against low pressure cylinder being relieved.

In these known braking systems, the falling of the back pressure acting against the low pressure cylinder is made abruptly through a valve which opens instantly at the changing of steps which is cause of a jerk in the braking action and deprive it of any precision and progressivity.

An object of the present invention is to remedy this serious disadvantage and to provide, to the braking mechanism, the necessary progressive and precise operation.

Another object of the invention is to provide a single, strong and steady construction.

A third object of the invention is to insert the whole mechanism in the stepped piston.

Another object of the invention is to maintain a slight back pressure in the pump, the pipes and the brake cylinder when the device is idle.

Other features and advantages will hereinafter appear.

The invention is illustrated in the accompanying drawings, in which.

The figures and diagrammatic views illustrate the device embodying the invention which is extended to the various original particularities shown in the represented arrangements.

Figure 1:
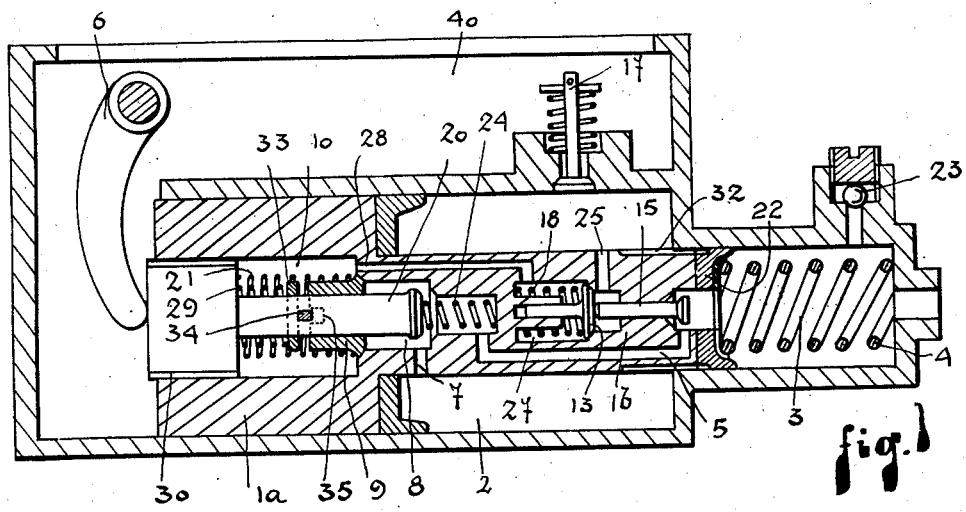
Figure 1 illustrates one form of the invention.

In the form of the invention illustrated in Figure 1, a pump includes a low pressure cylinder 2 of relatively large cross-section and a high pressure cylinder 3 of comparatively small cross-section provided with the stepped piston 1a, 1b, fitted with return spring 4.

When idle, as shown in Figure 1, cylinders 2, 3 are connected together and to the reservoir 40 by the ducts 5, 7, 8, 10 and grooves 30; liquid compressed by piston 1a may be forced in cylinder 3 through the ducts 32 and the yielding of the sleeve 22; liquid from the reservoir may flow in low pressure cylinder 2 through automatic valve 17 which opens when there is a vacuum in said cylinder; liquid from cylinder 2 may return in reservoir through valve 13 which is held closed by spring 18; tappet 15, on which acts the pressure raised in the high pressure cylinder 3 and in the feeding pipes leading to the brake cylinders is connected to valve 13 and acts, jointly with valve 13, on return spring 18; in piston 1a is a valve 20 which may be seated against the action of return spring 21 to close duct 5 and another valve 9 which may lift against return spring 21 and is intended to maintain a slight back pressure in the pump, pipes and braking cylinders when idle; there is a valve 23 to remove the air which may accumulate in the apparatus. In the stem of the valve 20 is arranged a key 34 on which bears a ring 33, subjected to the action of a spring 29, a notch 35 being provided in the valve 9 in advance of the key 34. The valve 20 is also subjected to the action of a return spring 24.

As shown in Figure 1, the cross-section of the plunger 15 is smaller than the section of the valve 13. The ratio of difference between the cross-section of the plunger 15 and the section of the valve 13 is, however, smaller than the ratio between the area of the small piston 1b and the area of the large piston 1a.

Figure 2:
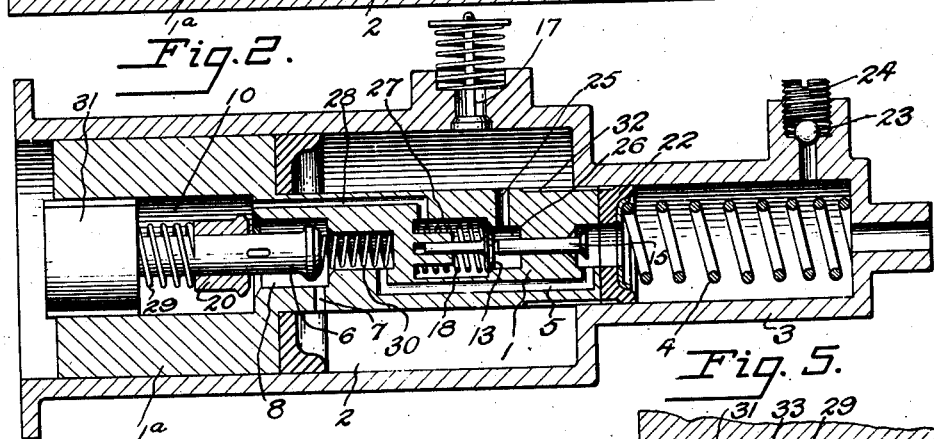
Figure 5:
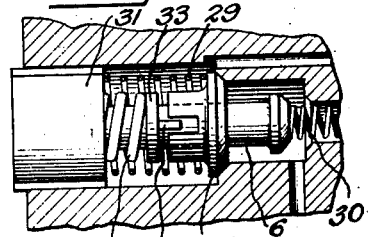
Figure 5 is a detail view of the valve mechanism.

When pistons are moved inwardly by the actuation of pusher 6, and as spring 4 is stronger than springs 21, 22 and 29, springs 24 and 21 are compressed and the ring 33 will be brought in contact with valve 9 seating it firmly against its seat through spring 29, thus closing any communication between the cylinders and the fluid reservoir through ducts 5, 7 and 8, the displacement of the ring 33 towards the valve 9 is permitted by the notch 35 provided in said valve 9; next, valve 20 will contact on its seat in piston 1b (as shown in Figure 2) and push the pistons ahead; if the effort applied on pusher 6 is increased, the low pressure piston 1a will compress the liquid and force it in the high pressure cylinder through ducts 32 and yielding of sleeve 22, said liquid being forced to the brake cylinders by high pressure piston 1b, as illustrated in Figure 2.

Figure 3:
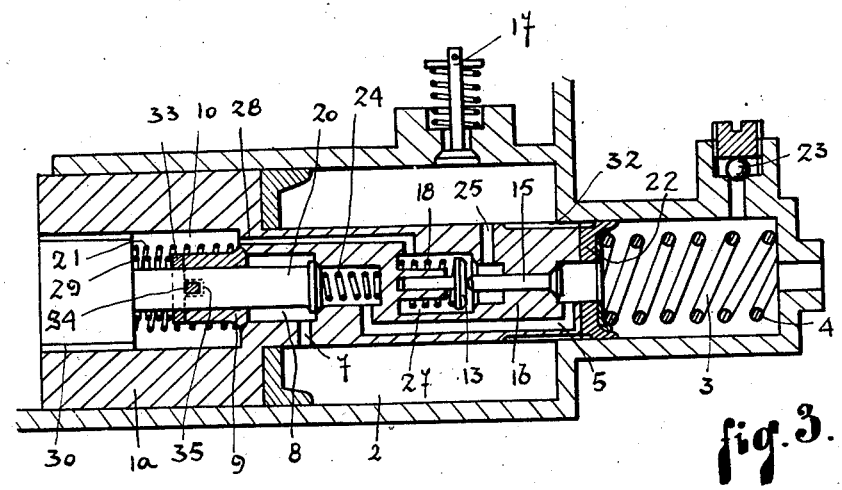
Figures 2 and 3 are views of the piston of Figure 1 respectively during the first and the second phases.

After the slack of the brakes has been taken up, the continued action on pusher 6 increases the pressure of the liquid and, for a given pressure, valve 13 will open against spring 18 under the combined action of pressure acting on said valve and pressure acting on tappet 15 (as shown in Figure 3); as valve 13 is open, some liquid will flow from cylinder 2 into the reservoir through ducts 25, 27, 28, 10 and grooves 30 and said flow of liquid shall bring, in said cylinder 2, a slight fall of pressure which will cause the closing of valve 13 if the action on the pusher 6 is stopped; pressure becoming lower in cylinder 2 than in cylinder 3, sleeve 22 is no longer able to yield and seals off the liquid in cylinder 3 cutting off the low pressure cylinder from the pipes leading to the brake cylinders.

After the low pressure cylinder is put out of action, a further action on pusher 6 will increase the pressure in the high pressure cylinder 3 sealing more and more firmly the sleeve 22 and, in an opposite way, the pressure will progressively drop in low pressure cylinder 2 because the increasing pressure in high pressure cylinder 3 pushing on tappet 15 will act on spring 18 and relieve gradually valve 13 as the pressure exerted on tappet 15 is increasing; for a certain pressure in the high pressure cylinder 3 and in the pipes leading to the brake cylinders, the action of tappet 15 on valve 13 shall be great enough to compensate the strength of spring 18 so that valve 13 shall remain open as illustrated in Figure 3, allowing liquid contained in cylinder 2 to flow in the reservoir without back pressure on piston 1a.

From that time, the apparatus will work as a single piston pump.

If the effort exerted on pusher 6 is released and if said pusher is allowed to come back to its idle position, as represented in Figure 1, first liquid shall flow from reservoir in cylinder 2 through valve 17, and next pressure shall equalize in the different chambers and ducts by the coming back of liquid from the brake cylinders, a slight back pressure remaining in said chambers and ducts on account of the action of valve 9, which may be given for when there is no use to maintain such back pressure.

Figure 4:
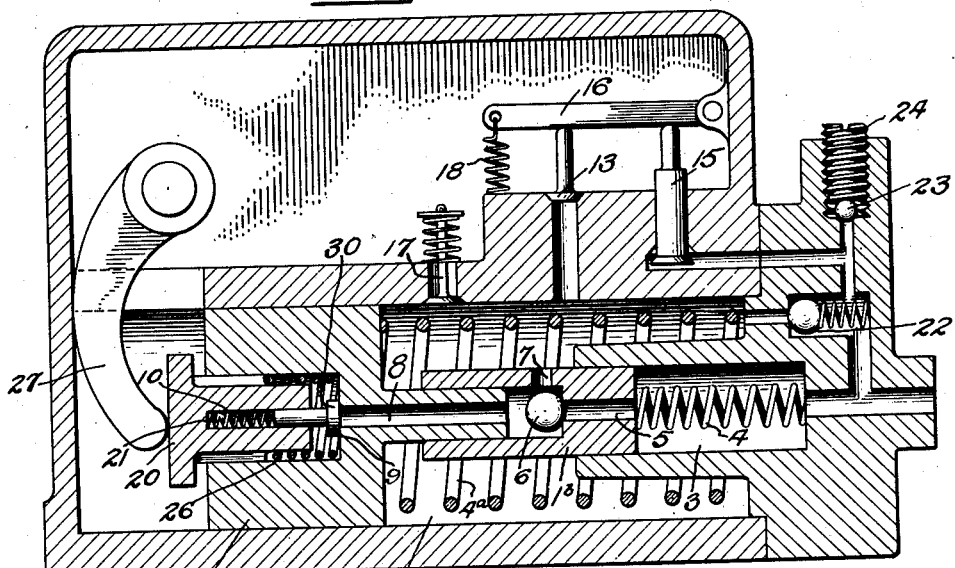
Figure 4 illustrates another form of the invention.

Figure 4 illustrates another form of the invention in which the mechanism is placed outside the pistons which are separate for low and for high pressure.

The pump includes a low pressure cylinder 2' with a low pressure piston 1a' and a return spring 4a' and a high pressure cylinder 3' with a high pressure piston 1b' and a return spring 4b'. When the device is idle, cylinders 2' and 3' are connected through pipes 5' and 7' and with the liquid reservoir through ducts 8', 10' and grooves 30'; cylinders 2' and 3' may also communicate through valve 22'; liquid may flow from reservoir in low pressure cylinder 2' through automatic valve 17' which opens when there is a vacuum in said cylinder; liquid contained in cylinder 2' may return in reservoir through valve 13' which is held closed by spring 18' and lever 16'; a tappet 15', on which acts the pressure raised in the high pressure cylinder 3' and in the feeding pipes leading to the brake cylinders, acts on lever 16' to lift it against spring 18' in a way to relieve valve 13'; in piston 1a' is a valve 9', controlled by spring 21' which is intended to maintain a slight back pressure in pump, pipes and brake cylinders when idle; valve 20' may be seated on piston 1a' by the action of lever 27' to close any communication between the inside of the cylinders and the reservoir; valve 23' is intended to remove the air that could accumulate in the device.

When pistons are pushed inwardly by the action of lever 27' and if strength of springs 21' and 26' is lower than that of spring 4a' the first action of lever 27' will be to contact valve 20' on its seat in piston 1a', thus closing any communication between cylinders and the fluid reservoir; if the effort applied on lever 27' is increased, the piston 1a' will proceed forward, compressing the liquid and, at a certain time, the extension 25' of piston 1a' will come into contact with ball 6' which constitutes a spherical headed valve, closing duct 5'; from that time, the two pistons will behave as a single unit.

Liquid compressed by low pressure piston 1a' will be forced through valve 22' in the pipes leading to the brake cylinders and the one compressed by the high pressure piston 1b will be forced directly in same pipes.

After the slack of the brakes has been taken up, the continued action on lever 27' makes the pressure grow and, for a certain pressure, valve 13' will rise against spring 18' under the combined action of pressure acting from low pressure cylinder on that valve and pressure acting from high pressure cylinder on tappet 15'; as valve 13' opens, some liquid will flow from cylinder 2' into the reservoir, said flow of liquid bringing, in said cylinder 2', a slight drop of pressure, which shall cause the closing of valve 22', cutting out cylinder 2' from the pipes leading to the brake cylinders; if the action on the lever 27 is stopped, the valve 13' will close.

After the low pressure cylinder 2' has been cut out, a further action on lever 27' will increase the pressure in high pressure cylinder 3', seating more and more firmly valve 22' on its seat and, in an opposite way, the pressure will progressively drop in low pressure cylinder 2' because the increasing pressure in high pressure cylinder 3' is pushing tappet 15' more and more strongly against lever 16' which relieves gradually valve 13'; for a certain pressure in the high pressure cylinder 3', the action of tappet 15' shall be strong enough to compensate the strength of spring 18' so that valve 13' remains open, allowing liquid contained in the low pressure cylinder 2' to flow in the reservoir without back pressure against piston 1a'.

From that time, the apparatus shall work like a single piston pump.

If the effort exerted on lever 27' is released and if said lever is allowed to come back to its idle position, as represented in Figure 4, the direct communication being established between the feeding pipes and the reservoir through ducts 5', 7', 8', 10' and grooves 30', pressure will equalize in the different chambers and ducts, a slight back pressure being maintained in said chambers and ducts on account of valve 9', which may be suppressed when there is no necessity to maintain any back pressure.

What is claimed to be new is:

A fluid system for transmitting power between a foot pedal or like element and a brake cylinder, comprising a piston unit having a large piston and a small piston, means responsive to the foot pedal for actuating said piston units, a cylinder for each of said pistons, a duct establishing communication between the small cylinder and the brake cylinder, a communication between the two cylinders, a valve in said communication opening towards the small cylinder, a fluid reservoir, a second communication between the large cylinder and the fluid reservoir, a valve in said second communication operable independently of the first mentioned valve and opening under pressure created in the large cylinder, resilient return means for said second valve, an element subjected to the pressure in the small cylinder for opening said second valve, a third communication between the large cylinder and the fluid container, a non-return valve in said third communication opening toward the container, spring means for holding the valve closed to maintain in the cylinders a light pressure when the system is idle, and closing means for said third communication actuated by the movement of the piston unit under the foot pedal, said first valve, second valve, element, non-return valve and closing means being carried by the piston unit.

OCTAVE LEPERSONNE.